(12) United States Patent
Loertscher

(10) Patent No.: US 6,378,741 B1
(45) Date of Patent: Apr. 30, 2002

(54) DOSING BOTTLE FOR DISPENSING FIXED DOSES OF LIQUIDS

(75) Inventor: Ulrich Loertscher, Zürich (CH)

(73) Assignee: Createchnic AG, Nürensdorf (CH)

( * ) Notice: Subject to any disclaimer, the term of this patent is extended or adjusted under 35 U.S.C. 154(b) by 0 days.

(21) Appl. No.: 09/514,199

(22) Filed: Feb. 25, 2000

(30) Foreign Application Priority Data

Mar. 30, 1999 (CH) .............................................. 0601/99
Mar. 30, 1999 (CH) .............................................. 0602/99

(51) Int. Cl.[7] .............................................. B67D 5/00
(52) U.S. Cl. ................. 222/456; 222/464.1; 222/465.1
(58) Field of Search ............................... 222/454–456, 222/464.1, 464.7, 465.1

(56) References Cited

U.S. PATENT DOCUMENTS

| 900,644 A | * | 10/1908 | Baeyer | 222/456 |
|---|---|---|---|---|
| 1,919,582 A | * | 7/1933 | Yasso | 222/456 |
| 1,952,558 A | * | 3/1934 | Miller | 222/456 |
| 2,010,126 A | * | 8/1935 | Akers | 222/456 |
| 2,233,996 A | * | 3/1941 | Dent | 222/456 |
| 3,107,031 A | | 10/1963 | Adams | 222/1 |
| 4,893,732 A | * | 1/1990 | Jennings | 222/456 |
| 5,067,637 A | * | 11/1991 | Aurness et al. | 222/456 |
| 5,695,093 A | * | 12/1997 | Lucius | 222/454 |
| 6,076,708 A | * | 6/2000 | Ceccarelli et al. | 222/456 |

FOREIGN PATENT DOCUMENTS

GB 407854 3/1934

\* cited by examiner

*Primary Examiner*—J. Casimer Jacyna
(74) *Attorney, Agent, or Firm*—Pauley Petersen Kinne & Erickson

(57) ABSTRACT

A dosing bottle made in one piece from plastic using a blow molding or an injection molding method. With at least one mash seam or a constriction in the bottle walls, a separate dosing chamber with an opening passing through to an inside of the bottle is formed at a bottom of the bottle. The dosing chamber communicates with an outlet tube which runs through the inside of the bottle to an opening in such a manner that whenever the bottle is tipped forwards by 90° to 180° from its upright position into a pouring position, only the liquid in dosing chamber can be poured out of the bottle.

13 Claims, 4 Drawing Sheets

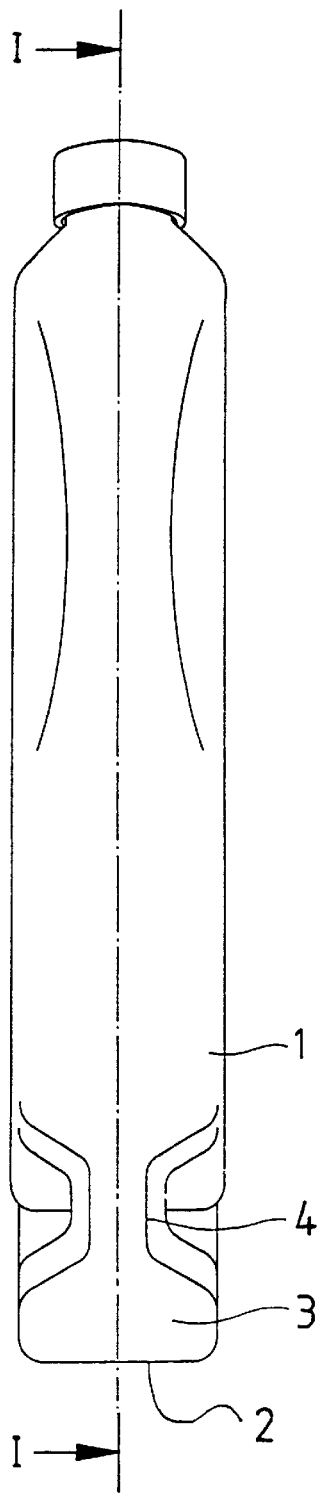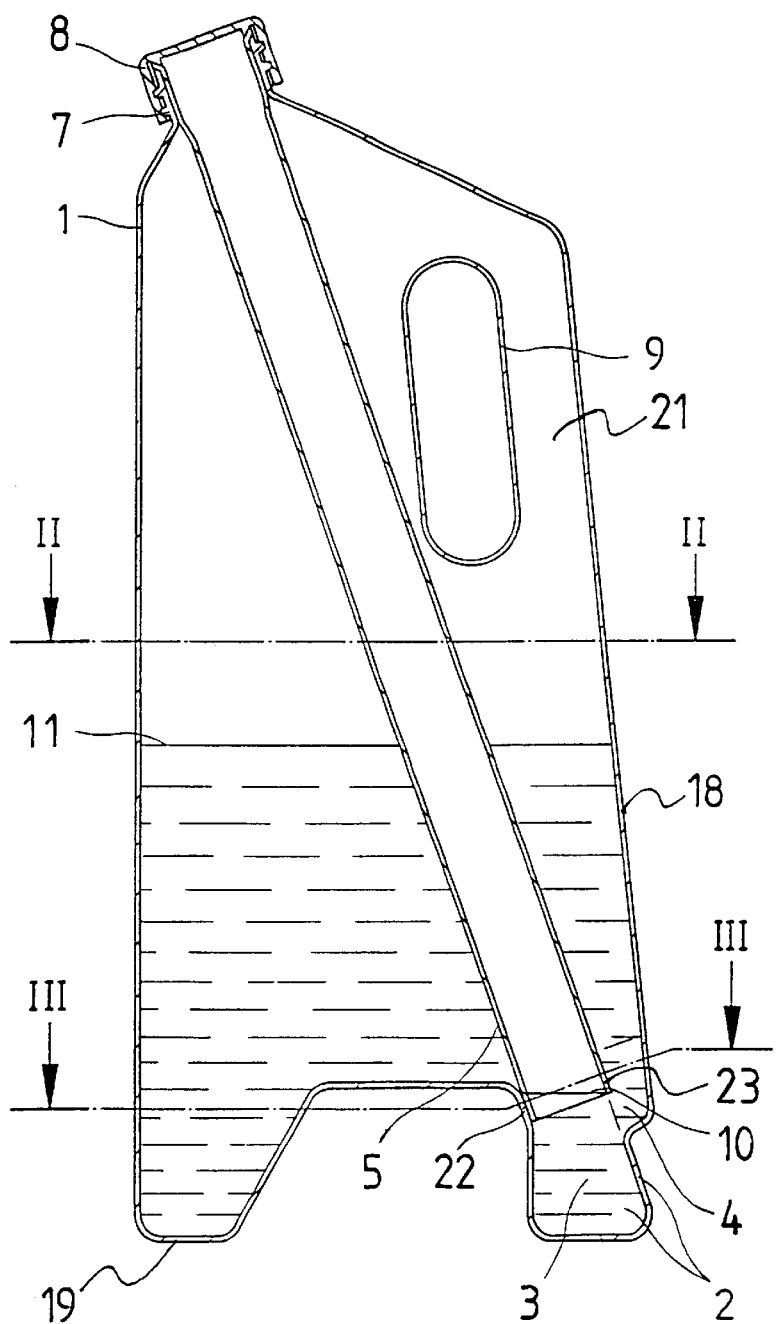

DOSING BOTTLE FOR DISPENSING FIXED DOSES OF LIQUIDS

BACKGROUND OF THE INVENTION

1. Field of the Invention

This invention relates to an inexpensive dosing bottle for consistently dispensing exactly the same volume of liquid. Inside a body of the bottle there is a dosing chamber which communicates with the bottle opening. When the bottle is tipped forward, only the liquid in the dosing chamber is dispensed, without any other liquid being able to flow into the dosing chamber from inside the bottle. When the bottle is tipped back into its starting position, the dosing chamber re-fills.

2. Description of Prior Art

It is often desirable to dose a predetermined, consistent volume of liquid from a bottle. This is true for detergents, washing powders, pesticides, fertilizers, syrups, mouthwashes and other fluids. The dosing operation is usually carried out with a separate measuring beaker, or the bottle top is used as a measuring beaker. One disadvantage of dosing in this manner is that the dosing operation is physically awkward because one needs two hands for operation and the accuracy of the dose depends on the user and is often improperly dosed. There is a risk of spilling liquid during dosing.

Furthermore, the measuring beaker has to be rinsed out after each use, otherwise the outside of the neck of the bottle gets smeared with dripping liquid after screwing on the top used as the measuring beaker. With concentrates in particular, there is a real danger of under-dosing or over-dosing because the measuring beaker can easily be filled to above or below the dosing mark in haste, or depending on the temperament and dexterity of the user. If the liquid being dosed has to be poured, for example into a filling inlet with a screw top or snap-shut top, the user may lack enough hands to pour a dose of liquid from the bottle into the filling inlet. For example, the user needs one hand to hold the screw top or snap-shut top of the filling inlet, which leaves him with just one hand for the dosing and pouring operation. The user therefore has no other alternative but to hold the bottle with one hand, unscrew the measuring beaker with the other hand, and proceed to dose the liquid, after which the user sets the bottle down somewhere, thereby leaving one hand free to take off or hold open the top on the filling inlet.

The prior art proposes a number of solutions for more conveniently dosing a volume of liquid from a bottle by equipping such bottles with dosing chambers. Bottles of this type are based on some same physical principles as of this invention.

Adams, U.S. Pat. No. 3,107,031, for example, shows a dosing bottle with an L-shaped tube on an inside, of which a bottom end, which is angled because of an L shape, forms an actual dosing chamber. One disadvantage of this prior art solution is that, because of its shape, the tube cannot be introduced into a finished manufactured bottle. The two halves of the bottle therefore have to be stuck or welded together after the L-shaped tube is fitted. This is an expensive solution. Furthermore, when the level of liquid in the bottle falls to the top edge of the dosing chamber, for example the top edge of the part of the L-shaped tube disposed horizontally in the bottle, the doses become smaller and smaller, because at the level of the dosing chamber, liquid is captured from the bottom part of the bottle out of the range of the dosing chamber. As a result, it is impossible to empty the bottle completely. There will always be a certain volume that remains outside the dosing chamber.

Great Britain Patent Reference GB 407,854 shows a dosing container in a shape of a sheet metal canister with a tube fitted inside it. The dosing chamber is formed by a separation with a second bottom. Compared with current designs, this sheet metal canister is an expensive, complicated construction which is intended for both larger volumes of liquids and greater doses.

SUMMARY OF THE INVENTION

It is one object of this invention to overcome the disadvantages described above and to create a dosing bottle which, being of a very simple construction and method of production, is extremely inexpensive to manufacture, and also allows the user to reliably and conveniently dose a fixed volume of liquid, particularly with one hand.

In a dosing bottle for dispensing fixed doses, according to this invention, the bottle can be made in one piece from plastic using a blow molding or injection molding method, using one or several mash seams or a constriction in the bottle walls to form, at the bottom of the bottle, a separate dosing chamber with an opening passing through an inside of the bottle. The dosing chamber communicates with an outlet tube which runs through the inside of the bottle to the outlet so that whenever the bottle is tipped forwards by 90° to 180° from an upright position into a pouring position, only the liquid in the dosing chamber can be poured out of the bottle.

BRIEF DESCRIPTION OF THE DRAWINGS

Advantageous embodiments of a dosing bottle, according to this invention, are shown in the drawings and are described in the specification and claims, wherein:

FIG. 7 is a side view of the narrow side of a second embodiment of the dosing bottle with the outlet disposed to one side;

FIG. 8 is a view of a longitudinal section taken through the dosing bottle along the line I—I as shown in FIG. 7, providing a view of a wide side of the dosing bottle;

DESCRIPTION OF PREFERRED EMBODIMENTS

Figure 1:
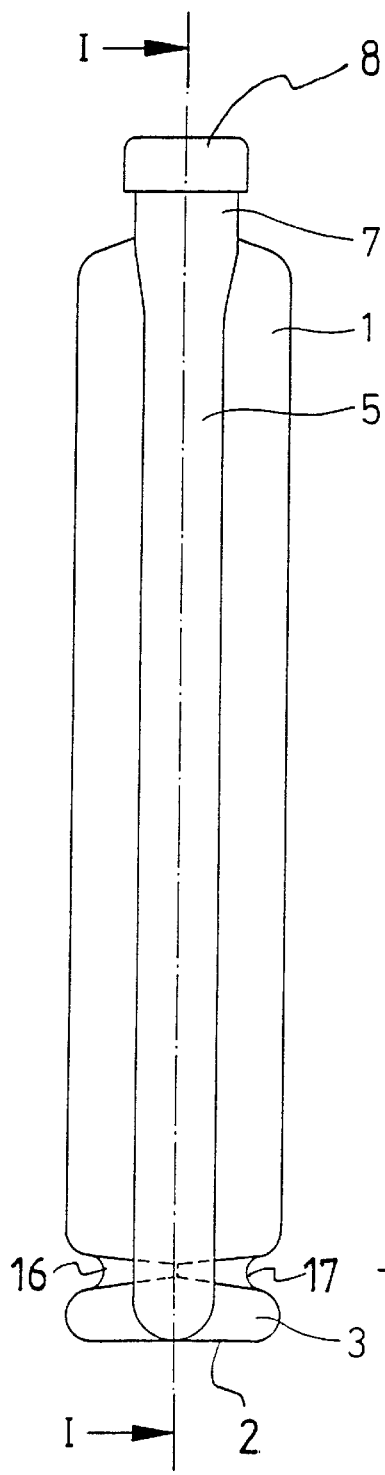
FIG. 1 is a side view of a narrow side of a first embodiment of a dosing bottle with an outlet disposed to one side.

FIG. 1 shows a view of a preferred embodiment of the dosing bottle 1, showing a narrow side, along which runs outlet tube 5. Above bottom 2 of bottle 1 made from plastic in any shape or size, there is dosing chamber 3, the size of which is a function of a fixed dose to be dispensed whenever bottle 1 is tipped forward. Dosing chamber 3 is separated from a remainder of the liquid in the bottle by a mash seam created by pressing in the walls of bottle 1 on both sides, as shown in FIG. 1. By means of renewed blow molding from two other points, the two supporting walls 16, 17 are then created according to a prior art blow molding technology method. Dosing chamber 3 then forms a bottle foot with a flat underside. The outlet or discharge tube 5 which communicates with dosing chamber 3, and which is also separated from the remainder of the liquid in the bottle by a mash seam which runs vertically in FIG. 1, leads to bottle opening 7 which is sealed off by a lid in the shape of a threaded top or snap-shut top 8.

Figure 2:
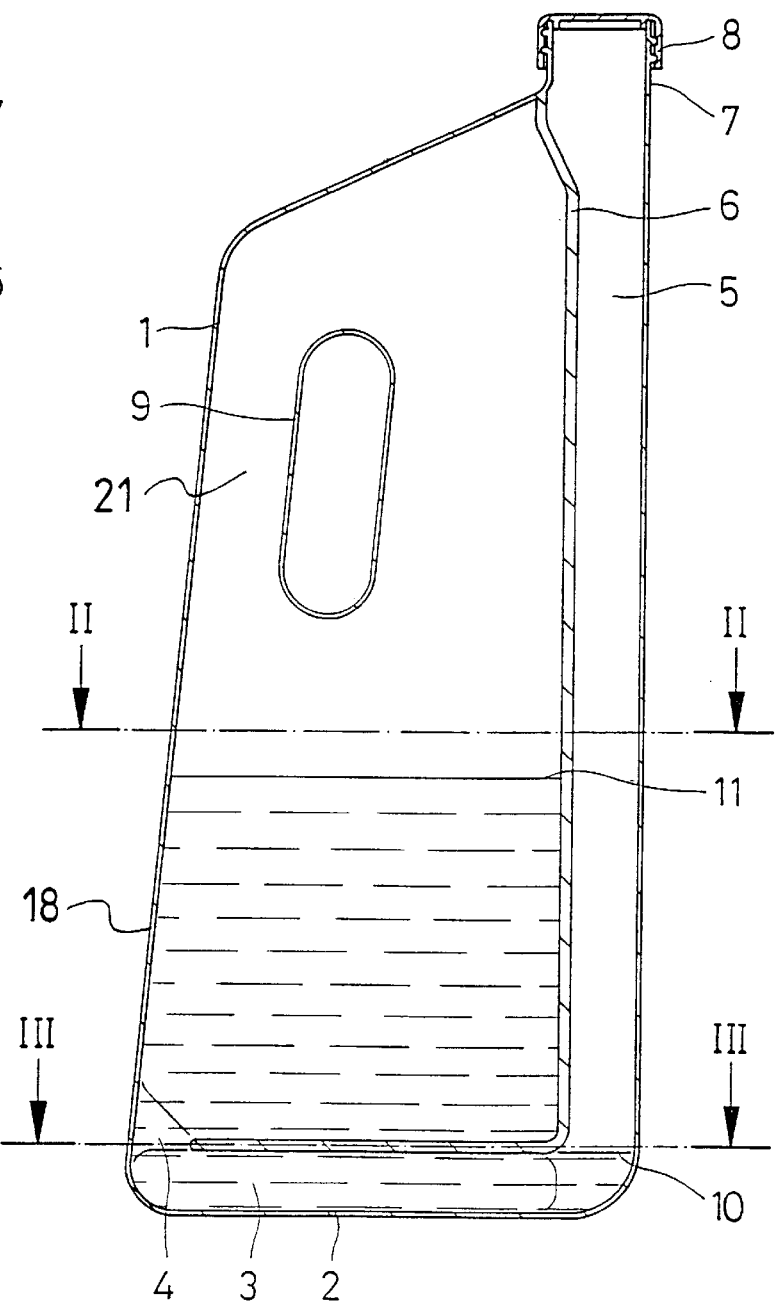
FIG. 2 is a view of a longitudinal section taken through the dosing bottle along the line I—I as shown in FIG. 1, providing a view of a wide side of the dosing bottle.

FIG. 2 shows a sectional view taken along the line I—I in FIG. 1. Mash seam 6, which is formed by reworking bottle 1 after it is preformed in polyethylene (PE) using an extrusion blow molding process, separates dosing chamber 3, discharge tube 5 and bottle opening 7 from the remaining space inside bottle 1. Mash seam 6 starts at dosing chamber opening 4, which forms a connection to the inside of bottle 1. Top 8 can be any of the usual screw-on or snap-shut tops. In this example, bottle 1 is made with opening 9 which forms handle 21. Handle 21 affords an easy way of gripping bottle 1 with one hand and tipping bottle 1 from an upright position into a pouring position and then back again to the upright position, whereupon dosing chamber 3 re-fills.

Irrespective of the actual level of liquid in bottle 1, which is indicated by element reference numeral 11, level 10 in dosing chamber 3 always comes to the top edge of dosing chamber opening 4, respectively the bottom edge of discharge tube 5. The partial vacuum that forms above liquid level 11 in bottle 1 as the liquids drains out of the inside of bottle 1 into dosing chamber 3 prevents the dosing chamber liquid level 10 from rising up inside discharge tube 5. If bottle 1 is tipped forward by an angle between 90° and 180° in the direction of bottle opening 7, for example in a clockwise direction in FIG. 2, the content of dosing chamber 3 first flows into outlet tube 5 and then through bottle opening 7 and out of the open bottle 1. At the same time, the liquid remaining in bottle 1 collects in the top area of bottle 1 and no other liquid is able to flow into dosing chamber 3 and outlet tube 5. As soon as bottle 1 is tipped slightly forward beyond 90°, the level of liquid in bottle 1 no longer reaches opening 4 disposed at the top of dosing chamber 3. If bottle 1 is then tipped from the pouring position back to the upright position, opening 4 essentially turns around the liquid in bottle 1 until it is immersed in it. When this happens, liquid flows through opening 4 down into dosing chamber 3 until level 10 is reached again and dosing chamber 3 is completely full. By the time this happens, the pressure above the level of liquid 11 in bottle 1 has dropped to such a degree that no further liquid can flow into dosing chamber 3. For each dosing operation, therefore, top 8 is removed and bottle 1 is simply tipped forward into the pouring position, where exactly the same volume of liquid is dispensed each time. Each time bottle 1 is tipped back into the upright position, dosing chamber 3 re-fills with exactly the same volume of liquid. Only one hand is required to pour out liquid and then tip bottle 1 backwards to re-fill dosing chamber 3. Right at the very end, when there is only a very little liquid remaining in the bottle, dosing chamber 3 does not fill up quite to the top. Hence it is only the very last dose that does not coincide exactly with the planned dosing volume.

Figure 3:
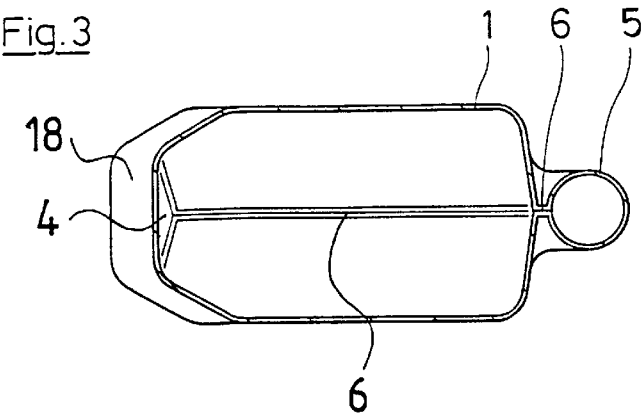
FIG. 3 is a view of a cross-section taken through the dosing bottle along the line II—II as shown in FIG. 2.

FIG. 3 shows a cross-section taken through the body of bottle 1 along the line II—II in FIG. 2. A cross-section is visible through the bottle wall, the mash seam and discharge tube 5. At the back, which is on the left in FIG. 3, the outside 18 of the wall of bottle 1 can be seen, which slopes away outwards at that point. Lower, looking towards the bottom of bottle 1, the thick mash seam 6 can be seen, which separates dosing chamber 3, and to the left of it, part of opening 4 from the inside of bottle 1 to dosing chamber 3.

Figure 4:
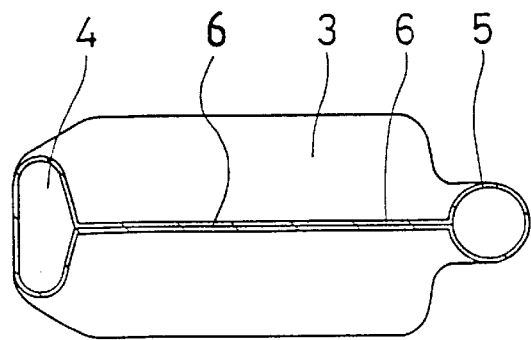
FIG. 4 is a view of a cross-section taken through the dosing bottle along the line III—III as shown in FIG. 2.

FIG. 4 shows a cross-section taken along the line III—III in FIG. 2. In this instance, the intersecting line is located just above dosing chamber 3, precisely along a middle of the height of the mash seam. The structure shown in this fashion is a container with two upwardly directed openings, namely opening 4 to the inside of bottle 1 on the left, and on the right the opening which opens out into outlet tube 5. Any size of dosing chamber 3 can be integrated inside bottle 1. In this example, the volume proportions are designed so that bottle 1 will deliver about 20 doses. The opening in dosing chamber 3, opening 4 from the inside of bottle 1 to dosing chamber 3, can be made in different sizes. It should be selected as a function of the viscosity of the filling liquid so that dosing chamber 3 fills up quickly, for example in 2 to 5 seconds, so that multiple doses can be poured out without delay.

Figure 5:
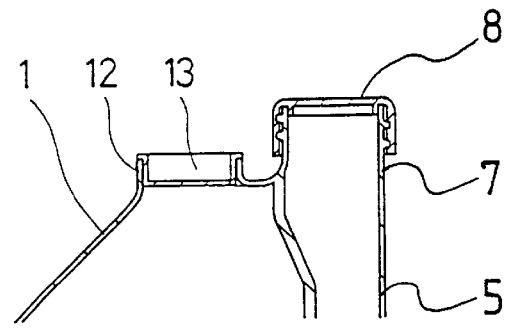
FIG. 5 is a view of a longitudinal section taken through the top end of a dosing bottle fitted with a separate filling inlet in addition to the outlet.

FIG. 5 shows a sectional view of a filling opening 12 of any size with top 13. When liquid is poured, top 8 on bottle opening 7 can already be shut as bottle 1 is filled with liquid. One advantage is that discharge tube 5 does not fill. If it were to fill, the volume of liquid inside would have to correspond to exactly one dose, as do the volumes subsequently dispensed from dosing chamber 3. If this is not the case, the first dose poured out after opening bottle 1 would be different, which is naturally undesirable. If bottle 1 is filled as described via filling opening 12 with opening 7 closed, full bottle 1 can be turned completely upside down and then returned to its upright position without the consistency of the doses being affected, for example without the first dose being any different.

Figure 6:
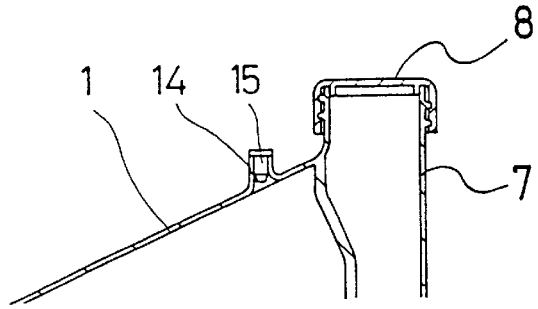
FIG. 6 is a view of a longitudinal section taken through the top end of a dosing bottle fitted with a separate air bleed vent in addition to the outlet.

FIG. 6 shows a sectional view of dosing bottle 1 with air bleed vent 14 and sealing plug 15. Air bleed vent 14 of this type is needed if bottle 1 is filled through bottle opening 7, because the air inside bottle 1 has to be able to escape. Instead of using sealing plug 15, air bleed vent 14 can also be pinched or welded together after the filling operation. It is also possible to have a simple hole that is glued together.

FIG. 7 shows an alternative embodiment of dosing bottle 1 of this type in a view of the narrow side of bottle 1. Instead of arranging dosing chamber 3 as a horizontal tube, it is possible in this instance from a separate bottle bottom 2, as shown in and described with respect to FIG. 8.

FIG. 8 shows how dosing chamber 3 is formed. The bottom of bottle 1 is essentially molded into two feet 2, 19, of which one foot 2, forms dosing chamber 3. Opening 7 is disposed at an angle on the opposite side of bottle 1 and sealed off with a threaded top 8 that functions as a lid. Connected in leakproof fashion with opening 7 is outlet tube 5, which passes through the inside of bottle 1 at an angle and opens just below top edge 22 of dosing chamber 3. Between this bottom opening 23 of outlet tube 5 and the adjacent inside wall of bottle 1 there is a space which serves as opening 4 connecting the inside of bottle 1 to dosing chamber 3. When bottle 1 is upright, the top edge of bottom opening 23 of outlet tube 5 defines the level of liquid 10 in outlet tube 5. More liquid does not flow through opening 4 into outlet tube 5, which is prevented by the partial vacuum formed above the level of liquid 11 in bottle 1 as liquid drains into dosing chamber 3. Simultaneously, atmospheric pressure takes effect in outlet tube 5 to counteract any increase in the level of liquid. Bottle 1 may also comprise hole 9 which forms a handle 21, as already described in relation to FIG. 2.

Figure 9:
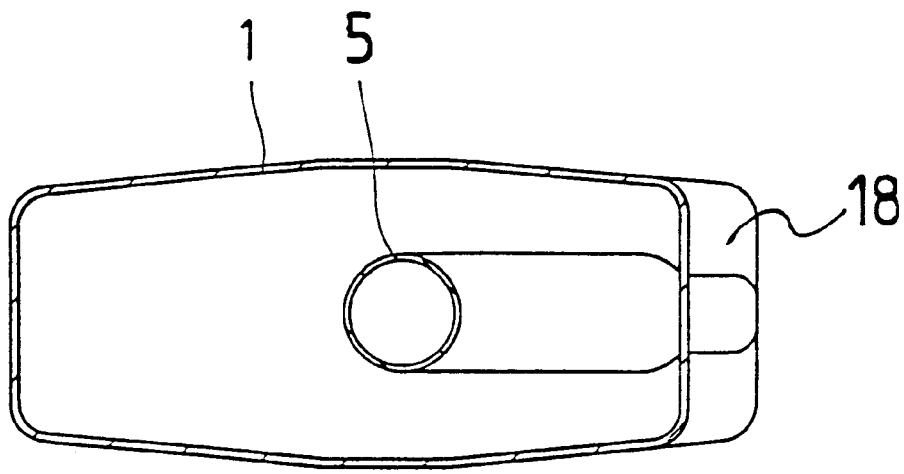
FIG. 9 is a view of a cross-section taken through the dosing bottle along the line II—II as shown in FIG. 8.

FIG. 9 shows the same bottle 1 in a cross-section along the line II—II in FIG. 8. One can see the walls of bottle 1 as well as the obliquely upwardly running outlet tube 5, and part of the outer wall 18 of bottle 1, which runs outwards at an angle in this instance.

Figure 10:
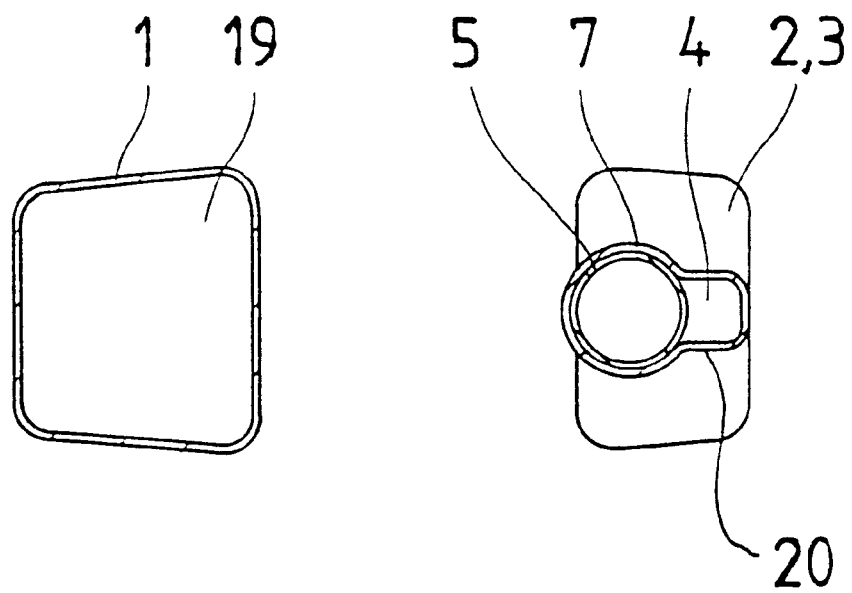
FIG. 10 is a view of a cross-section taken through the dosing bottle along the line III—III as shown in FIG. 8.

Finally, FIG. 10 shows a cross-section along the line III—III in FIG. 8. For the sake of clarity, FIG. 10 is effectively viewed in combination with FIG. 8. At the front of bottle 1 there is a separate flat foot 19. The flat foot 2 at the back forms dosing chamber 3. Opening 4 is restricted by constriction 20 in the wall of bottle 1.

Dosing bottle 1, whether in the version shown in FIGS. 1 to 6 or 7 to 10, is extremely comfortable with regard to handling and dosing liquids. To carry out a dosing operation bottle 1 can be held with one hand and simply tipped forward from the upright position to the pouring position. For each new dose it simply has to be returned to the upright position and then tipped forward again into the pouring position. Each such dosing operation finishes by dispensing a consistently large fixed dose, until the bottle is virtually empty. Only the very last dose may not necessarily contain the exact same volume as the dosing chamber. The bottle is also very inexpensive to manufacture from PE using an extrusion blow molding process.

Dosing bottle 1 of this type is designed for household use in particular, where liquids are still awkwardly dosed out using measuring beakers and pump bottles. Being inexpensive, bottle 1 of this invention is ideal for use as a disposable bottle.

I claim:

1. A dosing bottle for dispensing fixed doses, comprising: a bottle (1) made in one piece from plastic using one of a blow molding and an injection molding method, one of at least one mash seam (6) and a constriction in bottle walls forming at a bottom of the bottle (1) a separate dosing chamber (3) with a first opening (4) passing through to an inside of the bottle (1), the dosing chamber (3) communicating with an outlet tube (5) running through an inside of the bottle (1) to a second opening (7) such that whenever the bottle (1) is tipped forwards by 90° to 180° from an upright position into a pouring position only an amount of liquid in the dosing chamber (3) can be poured out of the bottle (1) and wherein the second opening is the sole liquid fill and dispensing opening for the bottle.

2. The dosing bottle of claim 1, the at least one mash seam (6) separates dosing chamber (3) and extends along the bottom of the bottle (1), the dosing chamber (3) runs into a vertical outlet tube (5) which communicates with the second opening (7) on one side and at a top on an other side has the first opening (4) by which the dosing chamber (3) can be refilled when the bottle (1) is in the upright position.

3. The dosing bottle of claim 2, further comprising a sealable air bleed vent (14) on a top side of bottle (1) next to the second opening (7).

4. The dosing bottle of claim 2, wherein the bottle (1) has a third opening (9) forming a handle (21) with which the bottle (1) can be tipped forward with one user hand.

5. The dosing bottle of claim 1, wherein one of the mash seams (6) on an inside of the dosing chamber (3) extends along the bottom of the bottle (1) and separates the outlet tube (5) that runs vertically along one side of the bottle (1) and communicates with the dosing chamber (3), the outlet tube (5) communicates with the second opening (7), the dosing chamber (3) has the dosing chamber opening (4) at a top of an other side, by which the dosing chamber (3) can be refilled when the bottle (1) is in the upright position.

6. The dosing bottle of claim 5, further comprising a sealable air bleed vent (14) on a top side of bottle (1) next to the second opening (7).

7. The dosing bottle of claim 5, wherein the bottle (1) has a third opening (9) forming a handle (21) with which the bottle (1) can be tipped forward with one user hand.

8. The dosing bottle of claim 1, wherein with a constriction in the bottle walls the bottom of the bottle (1) is molded into two feet (2, 19), one foot (2) of the feet (2, 19) forms the dosing chamber (3) with the outlet tube (5) running at an angle through an inside of the bottle from the opening (7) to end below a top edge (22) of the dosing chamber (3), wherein a space between a bottom tube opening (23) and an inside wall of the bottle (1) forms the opening (4) through to the dosing chamber (3) so that whenever the bottle (1) is tipped forwards by 90° to 180 ° from the upright position into the pouring position only the amount of the liquid in the dosing chamber (3) can be poured out of the bottle (1).

9. The dosing bottle of claim 8, further comprising a sealable air bleed vent (14) on a top side of the bottle (1) next to the opening (7).

10. The dosing bottle of claim 9, wherein the bottle (1) has a third opening (9) forming a handle (21) with which the bottle (1) can be tipped forward with one user hand.

11. The dosing bottle of claim 8, wherein the bottle (1) has a third opening (9) forming a handle (21) with which the bottle (1) can be tipped forward with one user hand.

12. The dosing bottle of claim 1, further comprising a sealable air bleed vent (14) on a top side of bottle (1) next to the second opening (7).

13. The dosing bottle of claim 1, wherein the bottle (1) has a third opening (9) forming a handle (21) with which the bottle (1) can be tipped forward with one user hand.

* * * * *